United States Patent
Le Bars et al.

(10) Patent No.: US 7,206,356 B2
(45) Date of Patent: Apr. 17, 2007

(54) WIRELESS TRANSMITTER WITH REDUCED POWER CONSUMPTION

(75) Inventors: Philippe Le Bars, Thorigne-Fouillard (FR); Alain Sehan, Lannion (FR)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 10/395,184

(22) Filed: Mar. 25, 2003

(65) Prior Publication Data

US 2003/0232607 A1 Dec. 18, 2003

(30) Foreign Application Priority Data

Mar. 25, 2002 (FR) .................................. 02 03704
Jan. 17, 2003 (FR) .................................. 03 00517

(51) Int. Cl.
 H04L 27/04 (2006.01)
 H04L 27/12 (2006.01)
 H04L 27/20 (2006.01)

(52) U.S. Cl. .................. 375/295; 327/291; 332/106; 341/20; 341/173

(58) Field of Classification Search ............. 375/295; 327/291; 332/106; 341/20, 173
See application file for complete search history.

(56) References Cited

U.S. PATENT DOCUMENTS

| | | | |
|---|---|---|---|
| 4,866,647 A | 9/1989 | Farrow | 364/724.1 |
| 5,752,175 A * | 5/1998 | Roullet et al. | 455/183.1 |
| 5,886,572 A | 3/1999 | Myers et al. | 330/10 |
| 6,160,856 A * | 12/2000 | Gershon | 375/320 |
| 6,191,650 B1 * | 2/2001 | Backram et al. | 330/10 |
| 6,256,482 B1 | 7/2001 | Raab | 455/108 |
| 2002/0048261 A1* | 4/2002 | Brioschi et al. | 370/252 |
| 2005/0164648 A1* | 7/2005 | Gannholm | 455/84 |

FOREIGN PATENT DOCUMENTS

| | | |
|---|---|---|
| EP | 0 998 088 A2 | 5/2000 |
| EP | 1 035 701 A1 | 9/2000 |
| FR | 2 807 252 | 10/2001 |

OTHER PUBLICATIONS

L.R. Kahn " Single-Sideband Transmission by envelope Elimination and Restoration" Proceedings of the I.R.E., vol. 40, No. 7, Jul. 1952, pp. 803-806.
F.H. Raab, et al.: "High-efficiency multimode HF/VHF transmitter for communication and jamming" Military Communications Conference, 1994. Milcom '94. Conference Record, 1994 IEEE Fort Monmouth, NJ, USA Oct. 2-5, 1994, New York, NY, USA, IEEE, US, Oct. 2, 1994, pp. 880-884, XP010149836.
U.S. Appl. No. 09/450,716, filed Nov. 30, 1999.

* cited by examiner

*Primary Examiner*—Mohammed Ghayour
*Assistant Examiner*—Erin M. File
(74) *Attorney, Agent, or Firm*—Fitzpatrick, Cella, Harper & Scinto

(57) ABSTRACT

This wireless transmitter is composed of at least one modulator, which comprises a digital part and an analog part. The digital part comprises elements for generating the envelope of the signals to be transmitted and elements for generating the phase of the signals to be transmitted.

12 Claims, 12 Drawing Sheets

WIRELESS TRANSMITTER WITH REDUCED POWER CONSUMPTION

This application claims the right of priority under 35 U.S.C. § 119 based on French patent applications Nos. FR 02 03704, filed Mar. 25, 2002 and FR 03 00517, filed Jan. 17, 2003, which are hereby incorporated by reference herein in their entirety as if fully set forth herein.

The present invention relates to a wireless transmitter with reduced power consumption.

The invention belongs to the field of signal transmission in a wireless environment.

It is well known to persons skilled in the art that the transmission of signals in a wireless context requires moving a signal from baseband to transposed band and using an antenna. A conventional way of effecting this frequency transposition on transmission as well as at reception is illustrated in FIG. 1.

The box 110 contains the frequency change stage.

On transmission, the signal to be transmitted E is buffered by an amplifier 111, then mixed by a mixer 112 with a signal output from a local oscillator 117. A band-pass filter 113 removes the unwanted images from the resulting signal. The signal is next amplified, for example by a variable-gain amplifier 120, and then an amplifier 121, generally referred to as a power amplifier PA because of the relatively high power demand for feeding the antenna 124. A band-pass filter 122 guarantees that only the frequencies of interest are transmitted with the greatest power possible.

A coupler 123 makes it possible to switch the power received on the antenna to the reception circuit. This coupler can be a simple switch if the system is of the semi-duplex type. From the coupler 123, the signal received drives an amplifier 125, often referred to as a low noise amplifier LNA 125, because of the low noise characteristic which this first amplifier in the reception chain must have to ensure correct reception. A variable attenuator 126 makes it possible to adjust the level of the signal received according to the processing which the latter will undergo subsequently. A band-pass filter 127 makes it possible to ensure that unwanted images are not created before the frequency change. The signal next enters a buffer amplifier 116 and is once again transposed in frequency by a mixer 115, using the signal output from the local oscillator 117. Finally, a band-pass filter 114 eliminates the unwanted resulting components.

In conventional applications, the frequency transposition stage 110 may be encountered several times, at different frequencies.

The power amplifiers used as power amplifiers may be class A, B or AB, according to the linearity required for complete transmission of the signal. The efficiency of these amplifiers is marginal when the signal to be transmitted has a high peak-to-mean ratio (this is the case, by way of non-limiting example, with an OFDM signal). This is because, though a class B amplifier can have an efficiency of 78.5% when the signal is sinusoidal and the peak of this sinusoidal causes saturation of the conducting transistor, the same is not the case in small signal mode, where high energy is necessary to bias the output stage. A large part of this energy is then lost by heat dissipation and not transmitted to the antenna.

There is known, for example through the article by Leonard R. Kahn entitled "*Single Sideband Transmission By Envelope Elimination and Restoration*", in Proceedings of the I.R.E., Vol. 40, No. 7, July 1952, a technique of improving the power consumption, referred to as the E.E.R. (Envelope Elimination and Restoration) technique.

FIG. 2 illustrates a conventional circuit implementing this technique.

The frequency transposition stage 110 of FIG. 1 is reproduced, which may be multiple. A variable gain amplifier 204 may be used. The output of this amplifier 204 drives a delay application cell 213 and an envelope detector 205. The output of the delay cell 213 drives an amplitude limiter 208. The output of the envelope detector 205 drives a class S amplifier 206. A class S amplifier is in fact a variable-width voltage to pulse converter. This amplifier 206 drives a low-pass filter 207. The assembly 206–207 therefore implements a DC—DC converter which is agile in voltage. The signal output from the low-pass filter 207 serves as a supply rail to the last stage of the power amplifier 209, which amplifies the phase signal output from the limiter 208.

There is therefore an elimination of the envelope, and then restoration thereof by the supply rail of the power amplifier.

The delay cell 213 makes it possible to guarantee the synchronism of the variations in envelope with respect to the phase identical to the original signal. This synchronism is in fact destroyed by the use of the low-pass filter 207 and must therefore be re-established. The delay cell may require appropriate adjustment if the components, in particular the low-pass filter 207, exhibit a variation in their propagation time, which is the case in mass production.

The reception path is identical to that of FIG. 1.

The problem of the delay is amplified if it is chosen to effect the frequency changes only on the phase, according to an architecture of the type illustrated in FIG. 3, in which the elements identical to those of FIG. 2 bear respectively the same reference numerals. It will be noted that the frequency transposition stage 110 is this time situated downstream of the delay cell 213. Such an architecture may prove advantageous since the frequency transposition may be effected on a signal of relatively low power, which makes it possible to conserve energy even more. However, the number of components increasing, the scatter in the total propagation time will be greater.

This problem of delay increases with the ratio between the frequency of the carrier and the maximum frequency of the envelope.

There is also known, through the document U.S. Pat. No. 5,886,572, a modulation method implementing the E.E.R. technique and also using a feedback loop which makes it possible to attenuate the distortions afforded by this technique and may sometimes make it possible to dispense with the delay cell described above.

The devices and methods of the prior art implementing the E.E.R. technique in a conventional fashion do not make it possible to obtain a satisfactory reduction in the power consumption while guaranteeing synchronism of the envelope variations with respect to the phase identical to the original signal.

The aim of the present invention is to remedy the drawbacks mentioned above, by dispensing with the envelope detection cell and the precise adjustment of the delay cell described above and by making automatic the adjustment of the synchronism of the variations in envelope with respect to the phase identical to the original signal.

For this purpose, the present invention proposes a wireless transmitter composed of at least one modulator, this modulator having a digital part and an analog part, notable in that the digital part has elements for generating the envelope of the signals to be transmitted and elements for generating the phase of the signals to be transmitted.

This digital part enables the adjustment of the synchronism of the variations in envelope with respect to the phase identical to the original signal, to be made automatic.

Thus the present invention makes it possible to ensure the restoration of the variations in envelope with respect to the phase identical to the original signal, in the context of the use of an improved E.E.R. technique.

It makes it possible to dispense with the use of two of the components of the circuits of the prior art: the envelope detector and the delay cell mentioned above. This makes it possible to reduce the power consumption of the circuit. This also allows mass production of the corresponding circuit while not requiring any adjustment, even when the variations in the various components cause scatter in propagation time.

According to a particular feature, the transmitter according to the invention further has elements for generating a signal carrying the phase information of the signals to be transmitted, which comprise a first variable delay application cell. These elements process signals in a frequency-transposed domain and do not directly supply the phase signal of the signals to be transmitted, hence the distinction between the "signal carrying the phase information" and the "phase signal".

This variable delay application cell is digital and makes it possible to advantageously replace all or part of the analog delay cell which is found in the prior art. It can be implemented easily from logic gates and flip-flops, and can therefore be integrated at low cost in an ASIC (Application Specific Integrated Circuit), an FPGA (Field Programmable Gate Array) or a DSP (Digital Signal Processor).

According to a particular feature, the first variable delay application cell is included in the elements for generating the phase of the signals to be transmitted.

According to a particular feature, the transmitter according to the invention further comprises a class D amplifier, amplifying the signal carrying the phase information delayed by the first variable delay application cell.

According to a particular feature, the class D amplifier is supplied by a signal carrying envelope information corresponding to the envelope generated by the elements generating the envelope of the signals to be transmitted.

The class D amplifier provides a significant saving in the total energy dissipated to transmit the signal to the antenna compared with class A, B or AB amplifiers.

The variable delay application cell allows resynchronization of the envelope and of the phase at the class D amplifier.

In a particular embodiment, the first variable delay application cell comprises:
  a unit for applying a continuously variable delay which is not a multiple of the sampling period used for the digital part of the transmitter;
  a plurality of delay elements connected in series and connected to the output of the unit for applying a continuously variable delay; and
  a unit for selecting a total value of the delay.

It is thus possible to generate a delay which is a multiple or not of the clock period of the digital system.

According to a particular feature, the selection unit is adapted to choose an integer number multiplying the sampling period.

The implementation of such a variable delay application cell can be effected by means of simple memory storage operations, without requiring any multiplication.

According to a particular feature, the envelope generation elements comprise a frequency transposition module, allowing suitable transmission in a wireless context.

According to a particular feature, the frequency transposition module comprises at least one digital mixer and at least one digital local oscillator.

Thus the extraction of the phase from the envelope is facilitated by a first frequency transposition. The digital implementation of the latter is particularly easy if the first transposition frequency is a submultiple of the clock frequency of the digital signal.

According to a particular feature, the digital part further comprises:
  a second variable delay application cell;
  a measuring unit adapted to compare a signal obtained from the signals to be transmitted with an original signal delayed by the second variable delay application cell; and
  a control unit connected to the measuring unit and adapted to supply to the first and second variable delay application cells control signals enabling the delays applied by the first and second cells to be adjusted.

This allows the automatic adjustment of the delay application cells, without manual intervention.

According to a particular feature, the analog part comprises a delay application unit acting on the phase of the signals to be transmitted.

For the same purpose as that indicated above, the present invention also provides a method of adjusting the synchronism of the phase between an original signal transmitted by a transmitter as succinctly defined above and a signal reconstructed on reception, this method being notable in that it is implemented by a control unit included in a transmitter as above.

In a particular embodiment, this adjustment method includes steps according to which:
  a principal value of the phase delay is determined, which is an integer multiple of a sampling period; and then
  a residual value of this delay is determined.

According to a particular feature, during the steps of determining the principal and residual values of the delay:
  the two signals compared by the measuring unit mentioned above are multiplied with each other; and
  the value of the phase delay is varied until the maximum value of the product of these two signals is obtained.

The present invention also relates to a digital signal processing apparatus comprising a transmitter as above.

The present invention also relates to a telecommunications network comprising a transmitter as above.

The present invention also relates to a mobile station in a telecommunications network, comprising a transmitter as above.

The present invention also relates to a base station in a telecommunications network, comprising a transmitter as above.

The particular features and the advantages of the adjustment method, of the digital signal processing apparatus, of the telecommunications network, of the mobile station and of the base station being similar to those of the transmitter according to the present invention, they are not stated here.

Other aspects and advantages of the invention will emerge from a reading of the following detailed description of a particular embodiment, given by way of non-limiting example. The description refers to the drawings which accompany it, in which:

FIG. 1, already described, illustrates schematically a first conventional radio transceiver and in particular its frequency transposition stage;

FIG. 2, already described, illustrates schematically a second conventional radio transceiver implementing the technique of envelope elimination and then restoration (E.E.R. technique);

FIG. 3, already described, schematically illustrates a third conventional radio transceiver also implementing the technique of envelope elimination and then restoration (E.E.R. technique);

Figure 12:
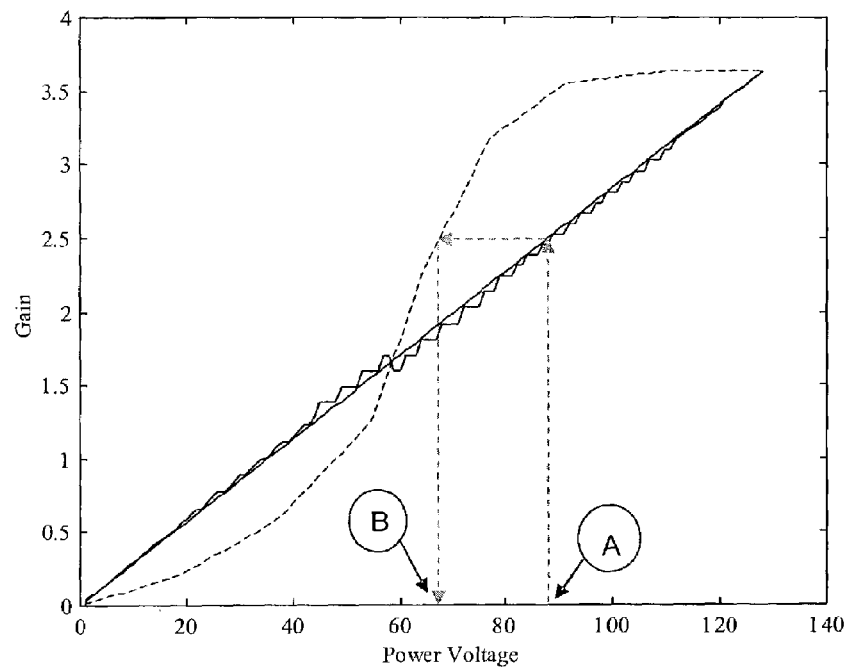
Figure 13A:
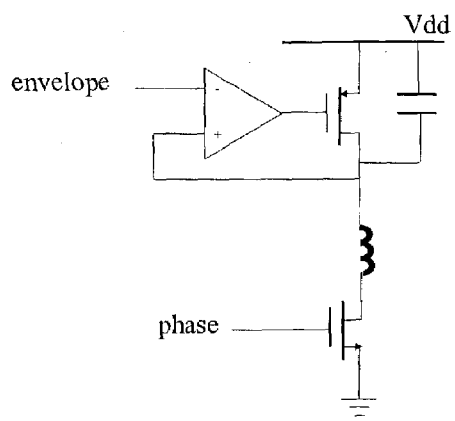
Figure 13B:
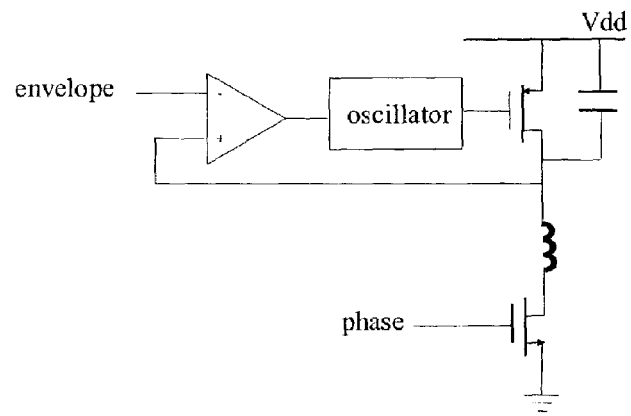

FIG. 12 is a graph illustrating the gain of a class D amplifier as a function of the voltage applied to its power supply, when the amplifier is used in a transmitter in accordance with the present invention; and FIGS. 13a and 13b illustrate two possible embodiments of an analog circuit providing a linearization by feedback when it is situated in a transmitter in accordance with the present invention.

Figure 5:
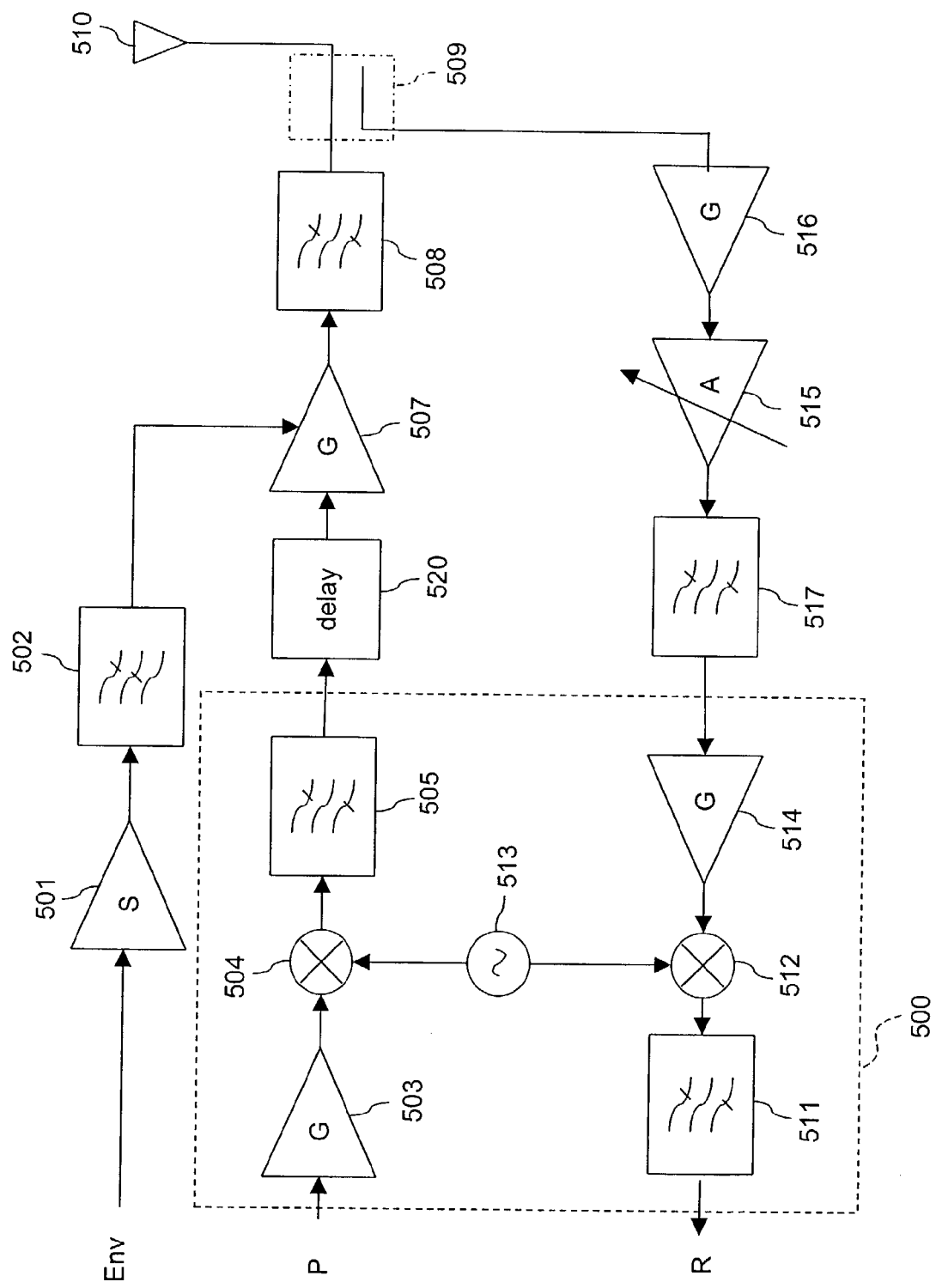
FIG. 5 illustrates schematically the analog part of a transmitter according to the present invention, in a particular embodiment.
Figure 6:
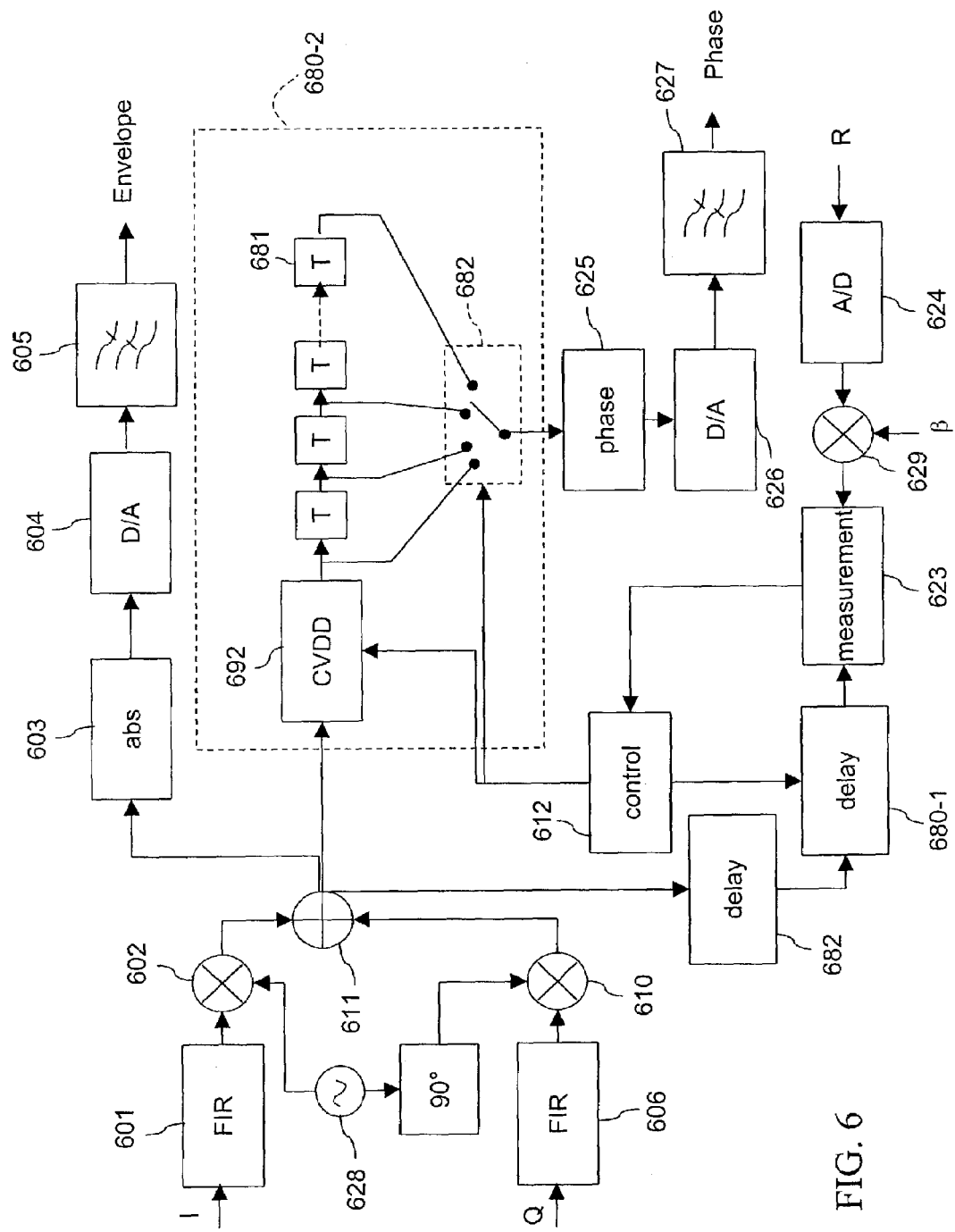
FIG. 6 illustrates schematically the digital part of a transmitter according to the present invention, in a particular embodiment.

The transmitter according to the present invention comprises an analog part and a digital part, illustrated respectively in FIGS. 5 and 6.

Figure 1:
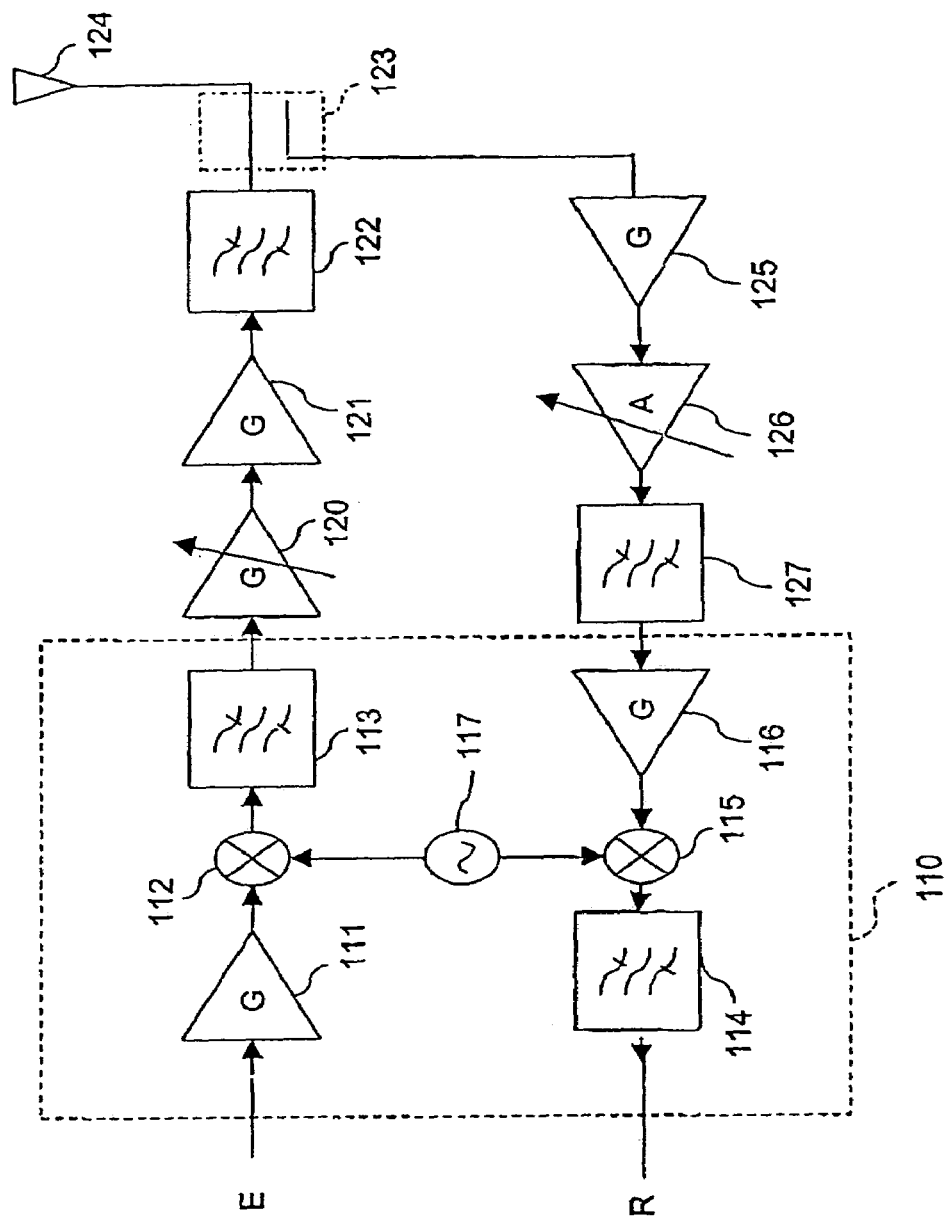
Figure 2:
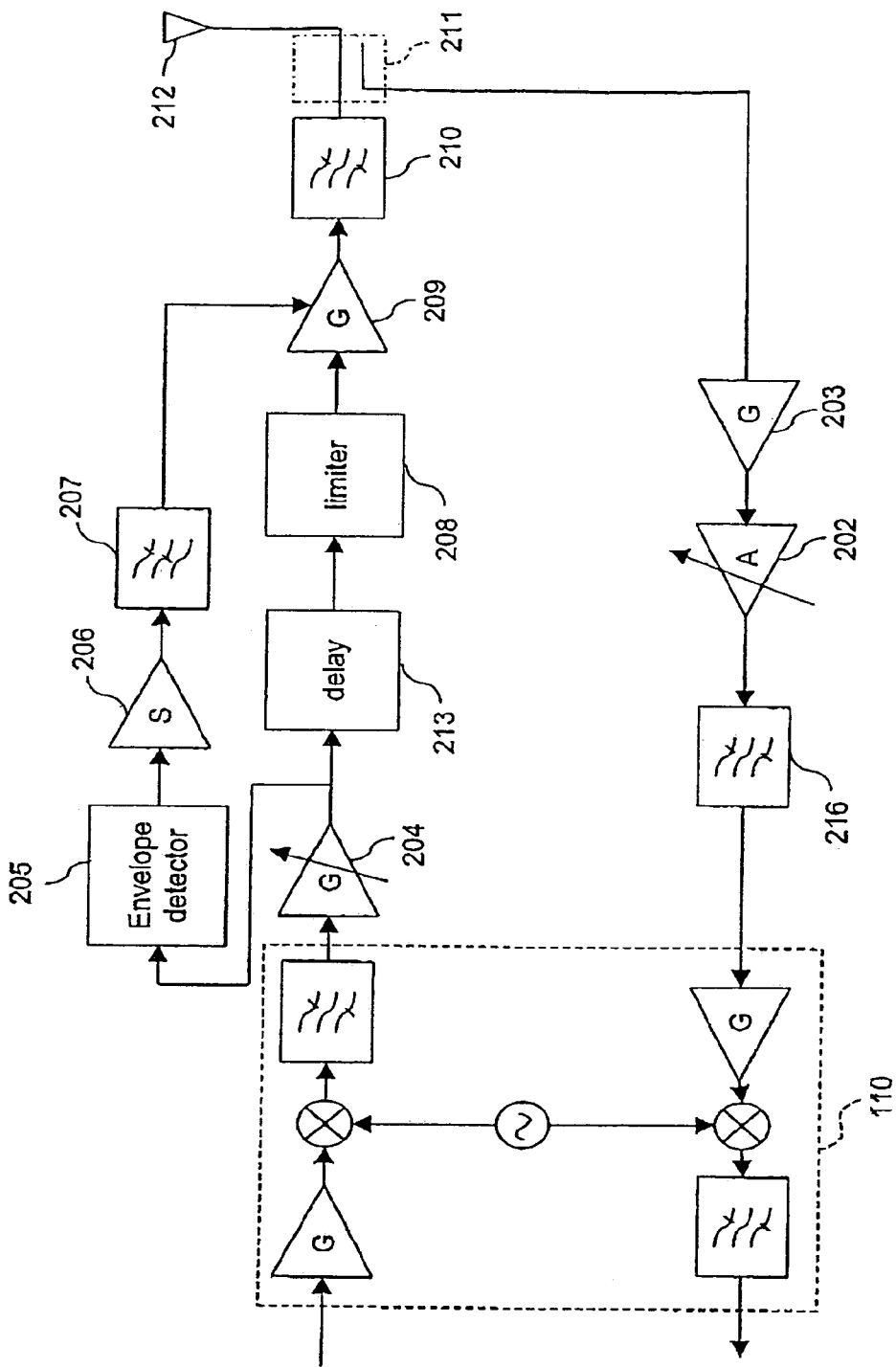
Figure 3:
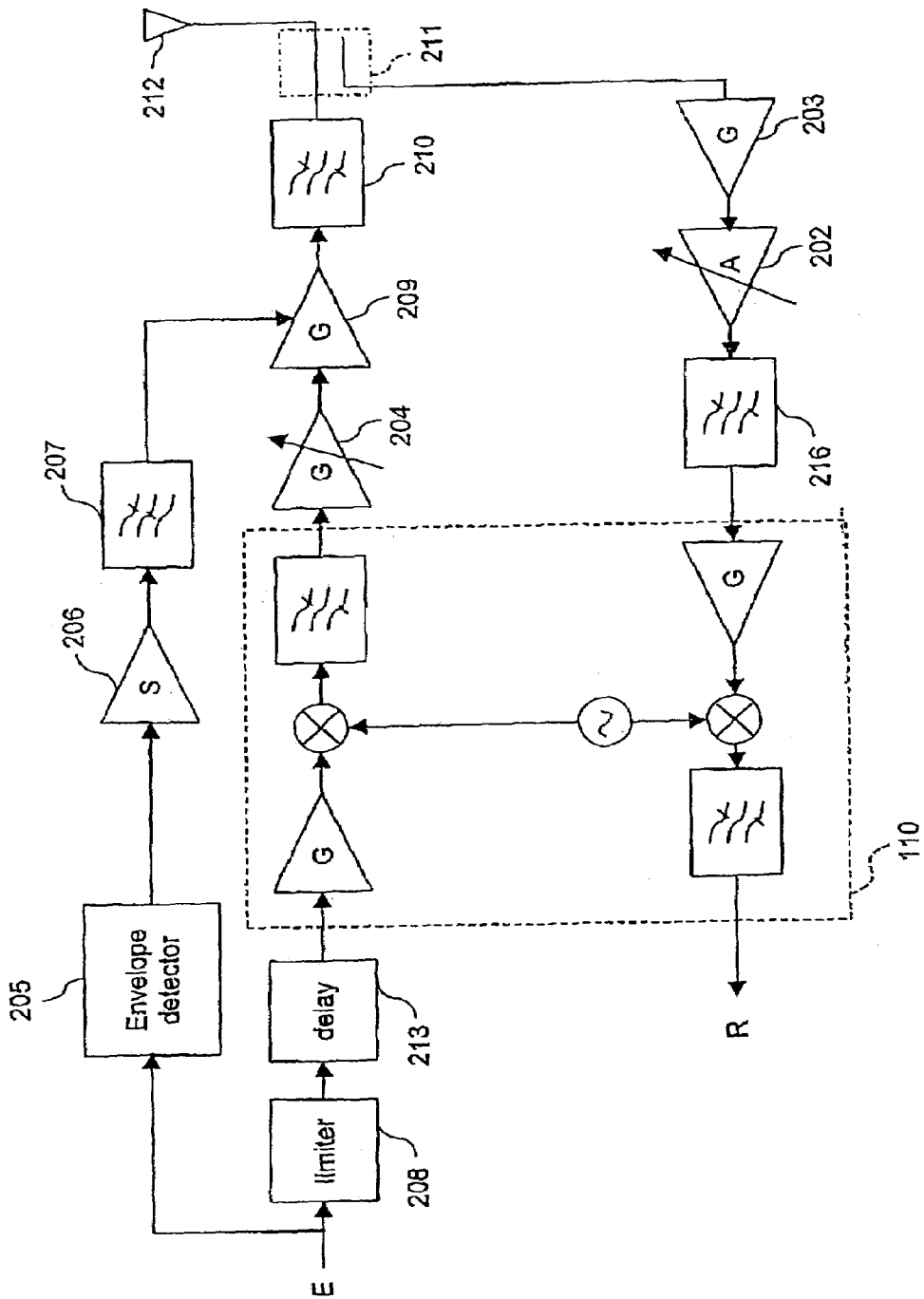

As shown by FIG. 5, the phase signal P follows a path where a frequency transposition stage 500 is reproduced, of the type described in relation to FIG. 1. The signal P is first of all buffered by an amplifier 503, then mixed by means of a mixer 504 with the signal output from a local oscillator 513. A band-pass filter 505 placed at the output of the mixer 504 removes unwanted images from the resulting signal.

The signal envelope Env is sent to a class S amplifier 501. This amplifier drives a low-pass filter 502. The signal output from the low-pass filter 502 serves as a supply rail for the last stage of a power amplifier 507, which amplifies the phase signal output from the band-pass filter 505. There is therefore elimination of the envelope, and then restoration thereof by the supply rail of the power amplifier 507, which is a class D amplifier. Optionally, a band-pass filter 508 can be provided at the output of the power amplifier 507. An antenna 510 transmits the resulting signal.

A coupler 509 makes it possible to switch the power received at the antenna 501 to the reception circuit. From the coupler 509, the received signal drives a low noise amplifier (LNA) 516. A variable attenuator 515 makes it possible to adjust the level of the signal received according to the processing which the latter will undergo subsequently. After this stage, a band-pass filter 517 makes it possible to dispense with the potential frequency images due to the demodulation. The signal then enters a buffer amplifier 514 and is once again transposed in frequency by a mixer 512, by means of the signal output from the local oscillator 513. A band-pass filter 511 placed at the output of the mixer 512 eliminates the resulting unwanted components.

In conventional applications, the frequency transposition stage 500 may be encountered several times at different frequencies.

Optionally, a delay application cell 520 can enable the synchronism between phase and envelope to be adjusted to the best possible extent, without however requiring high precision and without needing to compensate for the variations due to the components by means of an adjustment. The delay cell 520 can easily be dispensed with, in which case it suffices to provide more memory cells in the digital part described below.

FIG. 6 illustrates the digital part of the transmitter according to the present invention, situated upstream of the analog part illustrated in FIG. 5.

To obtain the envelope of the signal, in the particular embodiment described here, a first transposition frequency is created. This is not limiting: it is possible to calculate the final envelope from the baseband signal.

This first frequency transposition is performed, by way of example that is in no way limiting, by filtering of the real part I of the signal by means of an FIR (Finite Impulse Response) filter 601 and by filtering of the imaginary part Q of the signal by means of an FIR filter 606. The signals output from the filters 601 and 606 are multiplied, respectively by means of digital mixers 602 and 610, by the signal output from a digital local oscillator 628, offset in phase by 90° for the imaginary part Q, and are then added by an adder 611. As a variant, it is possible to use a Hilbert filter, known to persons skilled in the art, in order to perform the same function.

The signal envelope is created in a unit 603 which determines the absolute value of the signal leaving the adder 611. A digital to analog converter 604 and a low-pass filter 605 complete the transformation of the signal from the digital domain to the analog domain.

In order to create a phase signal, the signal output from the adder 611 enters a Farrow cell 692, which is a Continuously Variable Digital Delay circuit (CVDD) as disclosed in document U.S. Pat. No. 4,866,647.

Figure 4:
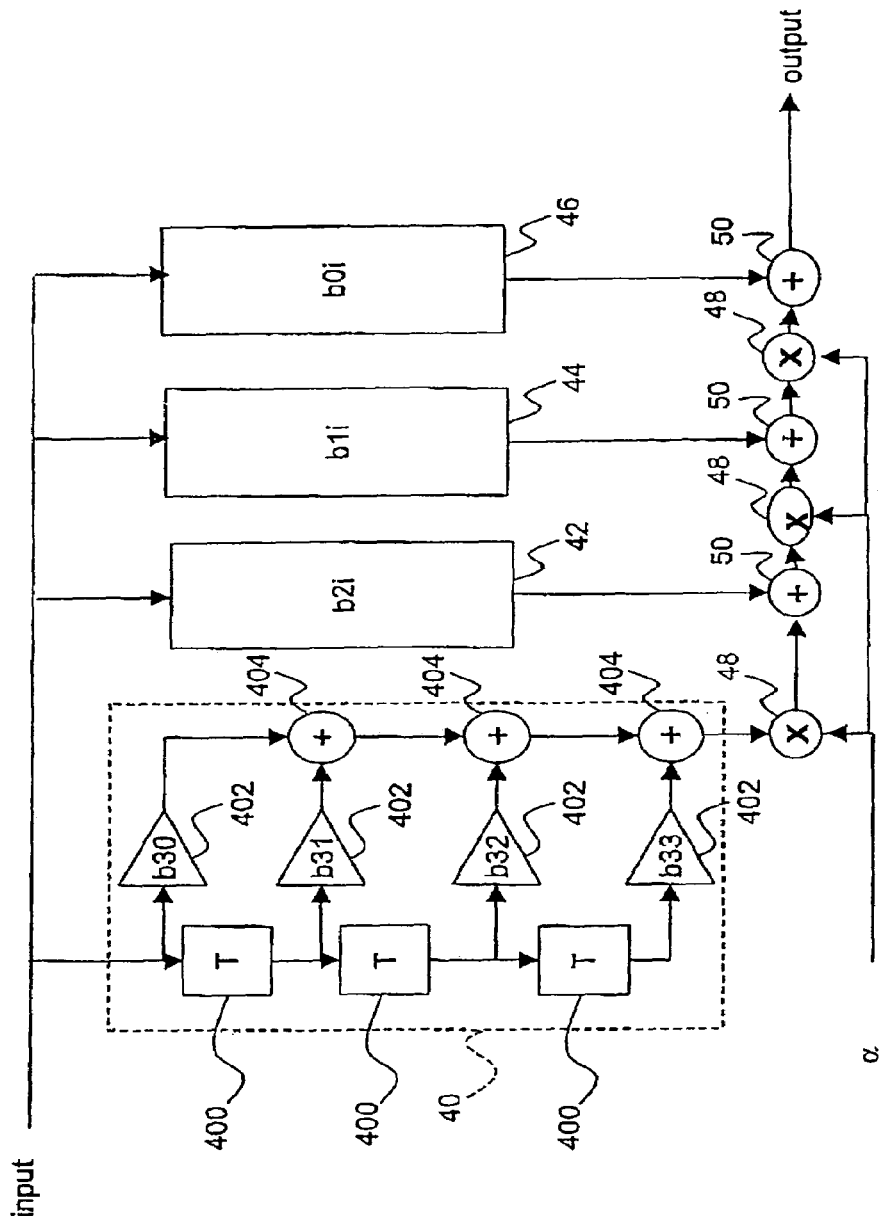
FIG. 4 illustrates schematically a continuously variable delay circuit of the prior art, known as a "Farrow cell"

Such a Farrow cell is illustrated in FIG. 4.

It comprises four identical subcells 40, 42, 44 and 46. The subcell 40 is an FIR digital filter with four coefficients. It consists of three delay introduction elements 400 and four amplifiers or multipliers with fixed coefficients 402. The respective values of these coefficients are b30, b31, b32 and b33. Three adders 404 make it possible to sum the outputs of the amplifiers 402. The output of the subcell 40 is multiplied by a coefficient α by means of a multiplier 48.

Because of the multipliers 48 and the adders 50 placed at the output of the subcells 40, 42, 44 and 46, the output of the Farrow cell is a digital signal $$y(k) = \sum_{l=0}^{3} \alpha_k^l v(l) \text{ with } v(l) = \sum_{i=0}^{3} x(m_k - i),$$

where x is the digital signal entering the Farrow cell and $m_k$ and k are integers representing multiplying factors of the time difference between two samples.

This forms an interpolator polynomial having α as a variable. By acting on the coefficient α, it is possible to interpolate the incoming signal according to the polynomial function chosen as a coefficient of the filters. In the embodiment described here, a Lagrange interpolation is used. This interpolator will make it possible to obtain a delay on the phase signal compared with the envelope signal which is not a multiple of the period of the sampling clock used in this digital process.

An assembly 680-2 is composed of the Farrow cell 692 and a certain number of delay elements 681, each introducing a delay with a duration equal to a period T of the sampling clock. A selector 682 makes it possible to choose an integer number multiplying the duration of the delay T. The assembly 680-2 therefore makes it possible to obtain a delay which is not a multiplication of the period of the sampling clock by an integer number. It is thus possible to ensure synchronism of the signals on reconstruction, whatever the scatter due to the variations in the components.

At the output from the selector 682, a signal is created which carries the phase information, in a unit 625. Throughout the remainder of the text, the misnomer "phase signal" will be used to refer to this signal.

The phase signal can simply be obtained by extracting the sign of the signal output from the assembly 680-2 if the frequency of the first frequency transposition is chosen so as to be equal to the result of the division by 4 of the sampling frequency. As a variant, the phase signal is obtained by amplitude limitation of the signal output from the assembly 680-2.

The phase signal next enters a digital to analog converter 626 and then a low-pass filter 627. The converter 626 can be very simple: it may for example create the voltage values +V, 0 and −V if the sampling frequency has been chosen to be a multiple of the first carrier frequency. It may therefore be implemented by means of elementary logic gates.

In order to compare the original signals and those reshaped by the power amplifier 507 of FIG. 5, it is necessary to create a path which is delayed by means of a first delay system 680-1 and additional delay elements 682. The principle of the delay system 680-1 is identical to that of the assembly 680-2. This delay is in fact advantageously adjustable since the time required for passing over the reception path is not negligible.

The original signal thus delayed enters a measuring unit 623, where it is compared with the reconstructed signal which comes from the reception chain and which was sampled by an analog to digital converter 624. An adjustment in gain may be made by means of the coefficient β of a multiplier 629. The result of the measurement supplied by the measuring unit 623 makes it possible to obtain, in a control module 612, control signals for adjusting the delay elements 680-1 and 680-2.

Figure 6A:
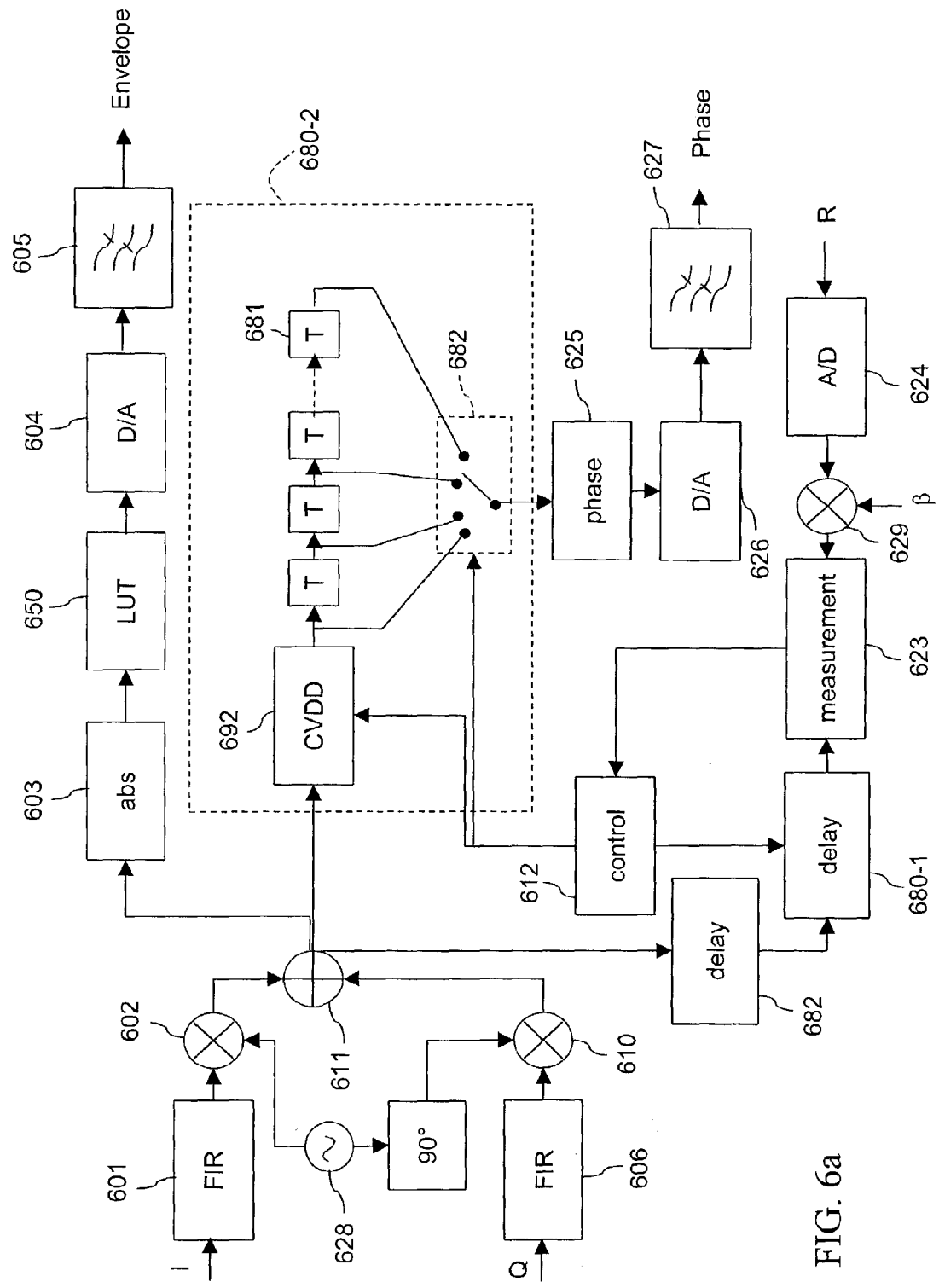
FIG. 6a illustrates schematically the digital part of a transmitter according to the present invention, in a variant of the embodiment of FIG. 6.

FIG. 6a illustrates the digital part of the transmitter in accordance with the present invention in a variant giving an improvement with respect to the particular embodiment of FIG. 6.

The propagation of radio waves is inversely proportional to a power of their frequency, the value of the exponent representing that power being different according to the models adopted. To obtain sufficient distances between the transmitter and receiver, the power required at the antenna for the high frequencies used (for example 5 GHz) may be considerable. In the non-limiting example of application of the invention to signals modulated according to an OFDM type modulation, the amplitude of the OFDM signals is then such that it is difficult to find components that are sufficiently linear to ensure the reproduction of the weak and strong amplitudes of the OFDM without distortion, more especially in the architecture of a class D amplifier, where the voltage of the amplifier's power supply, which is controlled by the envelope of the signal to be transmitted, is the parameter which governs the value of the amplification applied to the phase of the signal to be transmitted.

To remedy this problem, the invention provides, on the one hand, intervention on the amplifiers themselves in the analog domain, by addition of hardware, for the purpose of a linearization by feedback (illustrated in FIGS. 13a and 13b described below) and, on the other hand, intervention in the digital domain, by addition of a look-up table to the samples representing the envelope.

The graph of FIG. 12 illustrates the gain of a class D amplifier as a function of the voltage applied to its power supply. A relative gain is represented along the Y-axis and a relative voltage is represented along the X-axis. The straight line represents the ideal case, the curve having weak oscillations around the straight line represents the gain obtained taking into account a quantization over 7 bits and the other curve, which is dashed, represents the measured gain.

When the calculated value of the envelope is equal to A it can be seen that it is necessary to produce the value B to obtain the corrected value along the Y-axis of the deviation due to the real amplifier.

In the case of the gain curve really obtained, it can be seen that the error introduced is substantially less, thanks to the correction by transposition applied to the samples representing the envelope, as mentioned above. It should be noted that this curve is purely indicative, since it depends on a choice to perform the digital-analog conversion. This curve is given here by way of non-limiting example.

FIG. 6a shows the location of the look-up table 650 or LUT in the digital part of the transmitter in accordance with the present invention. All the other elements bear the same reference numerals as in FIG. 6 since they are identical and will thus not be described again here. The look-up table 650 is placed between the unit 603 for calculating the absolute value and the digital-analog converter 604. The table may be made using a read-only memory, of which the addresses come from the unit 603 for calculating the absolute value and whose data control the digital-analog converter 604.

This transposition is calculated once and for all at the time the circuits are produced. This is made possible by the fact that it is not envisaged to digitally correct the deviations due to temperature. For that, the methods in the analog domain are more appropriate.

Thus, FIG. 13a illustrates a feedback loop which makes it possible to ensure the fidelity of the signal with respect to its setting, which is the envelope of the signal to be transmitted. A capacitor and an inductor form a low-pass filter. A first transistor makes it possible to power a second transistor, which is the amplifier on which the modulation is reconstructed.

In FIG. 13b, the same mounting is used with an oscillator, of which the cyclic ratio is driven by the amplifier. This second solution, using a class S amplifier, consumes less power than the first solution, illustrated by FIG. 13a. It requires a value of capacitance such that the current is sufficient to power the modulating transistor. The capacitor participates in the low-pass filtering, the value of the capacitance is also constrained by the passband. As far as possible, a compromise is thus to be found.

In the solutions of FIGS. 13a and 13b, in variant form, the feedback loop may also be measured on a filter which would be inserted on the source of the modulating transistor.

Figure 7:
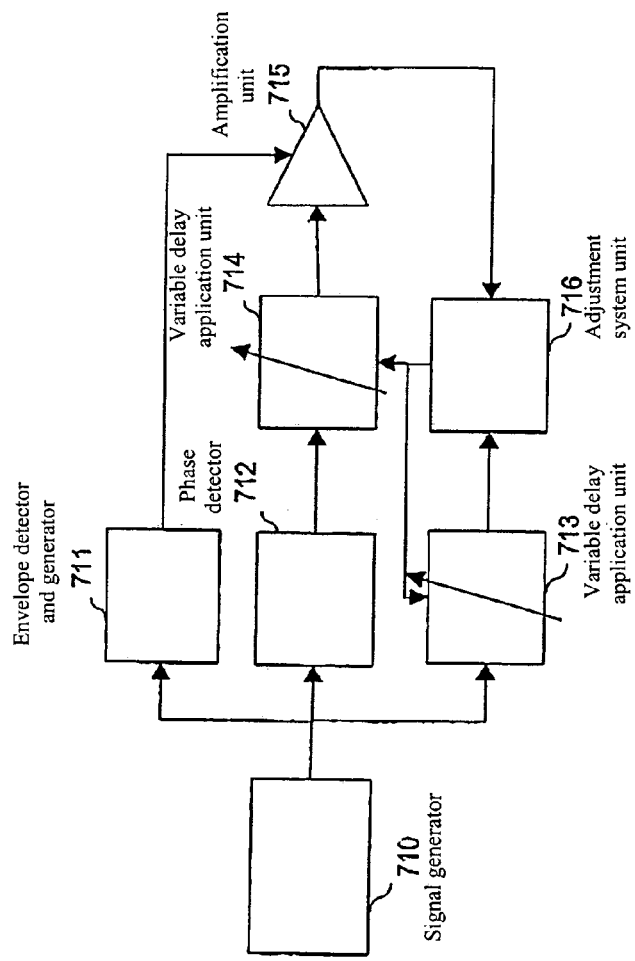
FIG. 7 is a circuit illustrating the principle of the adjustment of the delay in the digital part of the transmitter of FIG. 6.

The outline diagram in FIG. 7 illustrates the determination of the delay in the digital part of the transmitter in FIG. 6. In FIG. 7, to simplify, a representation of the analog to digital and digital to analog conversions has intentionally been omitted, as well as the frequency transpositions (direct and inverse).

The variable delay application units 713 and 714 represent respectively the modules 680-1 and 680-2 of FIG. 6. The amplification unit 715 represents all the operations undergone by the phase signal output from the variable delay application unit 714, including its amplification by the envelope signal calculated by the envelope detector and generator 711, from the original signal created by the signal generator 710. The unit 716 represents the delay detection and adjustment system and represents in particular the measuring unit 623 of FIG. 6. The unit 712 represents the phase detector.

The adjustment system 716 is capable of acting independently on the variable delay application unit 714 and on the variable delay application unit 713. This adjustment system 716 is supplied on the one hand by the original signal delayed by the unit 713 and on the other hand by the copy of the signal reconstructed at the amplifier 715.

As the demodulation causes a delay, this delay is first of all compensated for on a signal where only the phase undergoes changes in appearance, by means of the variable delay produced by the unit 713. Then the same operation is performed on a signal where only the envelope undergoes changes in appearance, by imposing a delay value simultaneously on the variable delay application unit 714 and on the variable delay application unit 713.

Figure 8:
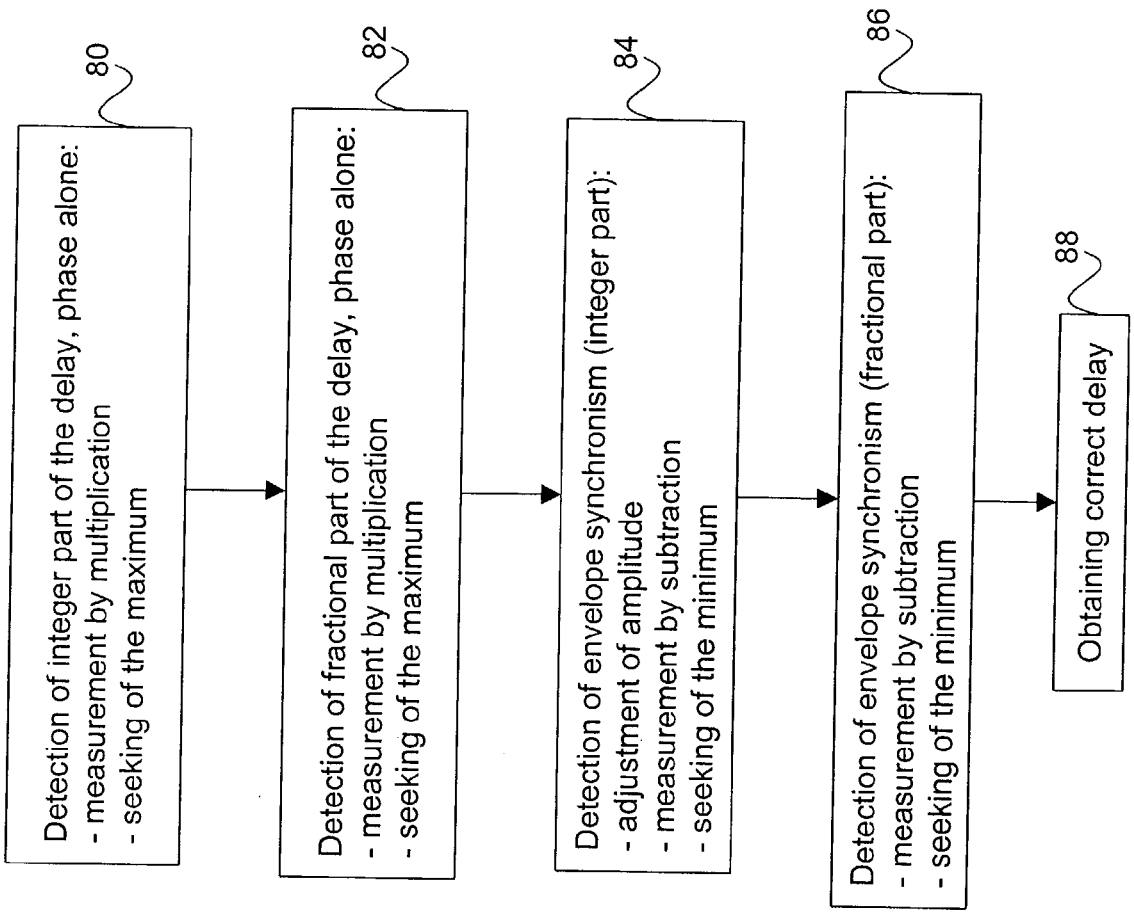
FIG. 8 is a flow diagram illustrating the principle of the adjustment of the delay in the digital part of the transmitter of FIG. 6.

The flow diagram in FIG. 8 illustrates the corresponding succession of steps.

During a first step 80, it is sought to determine the integer part (relative to the sampling rate) of the delay undergone by the phase alone.

Then, during a step 82, it is sought to determine the fractional part of this same delay.

For this purpose, the delay applied by the unit 713 to the signal output from the signal generator 710, which is a signal with a constant envelope, consisting of a phase-modulation sinusoid, is adjusted.

To this end, the two signals entering the unit 716 of FIG. 7 (or the unit 623 of FIG. 6) are multiplied and the delay is adjusted until the maximum value of the product of the two signals is obtained. The obtaining of this maximum corresponds to the appropriate value of the delay to be applied in the unit 713.

During the following step 84, it is sought to achieve a synchronous detection of the delay of the envelope, for the integer part of this delay (relative to the sampling rate). Then, during a step 86, it is sought to achieve a synchronous detection of this same delay for its fractional part.

For this purpose, the delay applied by the unit 714 is adjusted, this time by seeking the minimum value of the result of the subtraction of the two signals entering the unit 716 or 623. This minimum is obtained when the correct value of the delay is programmed in the unit 714.

The step 88 in FIG. 8 represents the obtaining of the correct values of the delays to be applied in the modules 680-1 and 680-2 of FIG. 6.

To detect the delay on the phase of the reconstructed signal, it is possible to use, by way of non-limiting example, a signal consisting of a sinusoid modulated by phase jump, with a constant envelope, that is to say $f(t)=A\times\cos(\omega t+\phi(t))$. The reconstruction of this signal has an identical frequency and is of the form $f'(t)=A'\times\cos(\omega t+\phi'(t))$. When these signals are multiplied, $f(t)\times f'(t)=A\times A'\times((1/2)\cos(\phi(t)-\phi'(t))+(1/2)\cos(2\times\omega t+\phi(t)+\phi'(t)))$ is obtained. This quantity is positive if and only if $\phi(t)=\phi'(t)$. The detection of negative samples therefore makes it possible to deduce therefrom that phase alignment is not obtained.

Figure 9:
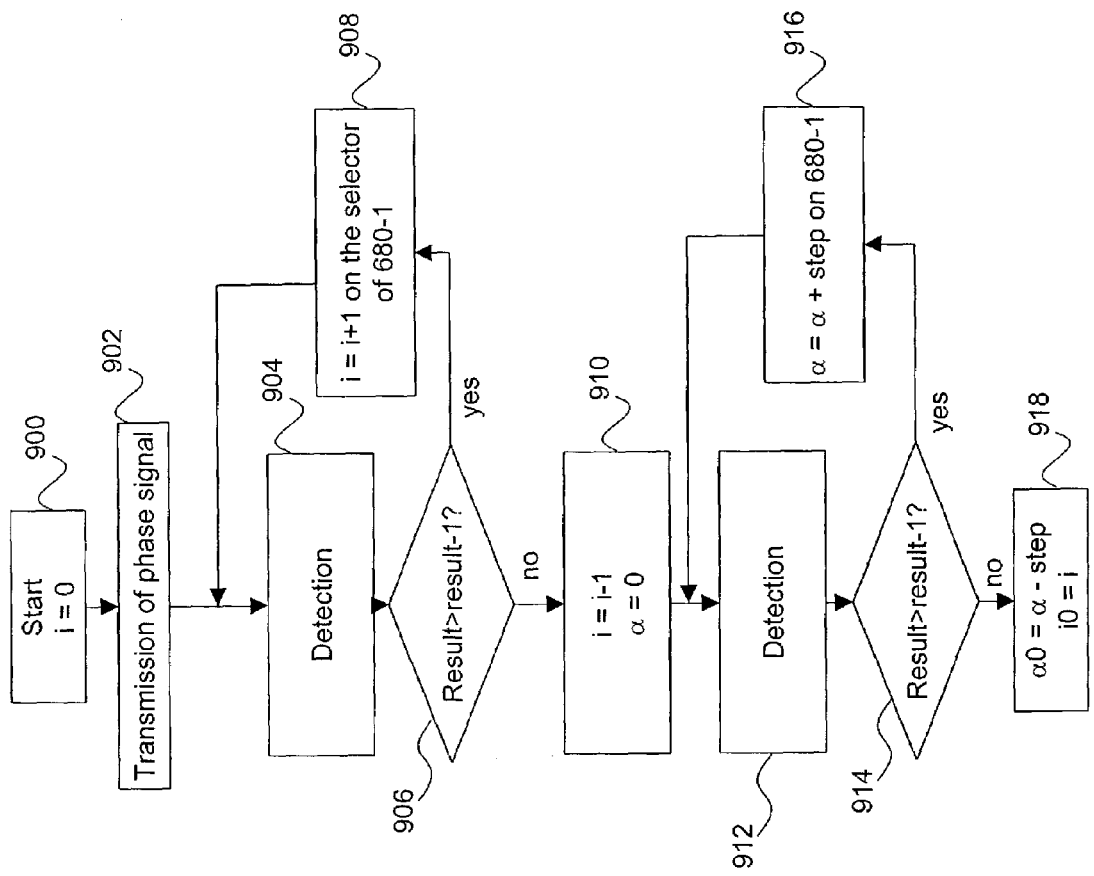
FIG. 9 is a flow diagram illustrating the adjustment of the synchronism of the phase between the original signal and the reconstructed signal, in accordance with the present invention, in a particular embodiment.

The flow diagram in FIG. 9 illustrates the method of adjusting the synchronism between the original phase and the phase of the reconstructed signal. During an initialization step 900, a variable i is initialized to the value 0. Then, during a step 902, the phase signal is transmitted.

During the following step 904, a maximum detection operation consists of multiplying the signals entering the unit 716 (FIG. 7) or 623 (FIG. 6). A test 906 makes it possible to check whether a local maximum is attained when action is taken conjointly on the cells 680-1 and 680-2, on the choice of integer delays, multiples of the period of the sampling clock, using the selector 682 (FIG. 6) for the cell 680-2 or using a similar selector present in the cell 680-1.

As long as a local maximum is not attained, the variable i representing the multiplication factor of the sampling clock period is incremented by one unit during a step 908.

When the maximum is attained or even exceeded, during a step 910, a process of adjusting the coefficient α which drives the Farrow cell 692 is initialized, by decrementing the variable i by one unit and initializing the coefficient α to the value 0. The following steps 912 and 914 are respectively similar to the steps 904 and 906 described previously. As long as the maximum is not attained, the value of the coefficient α is increased by a predetermined step size during a step 916. The process stops when the maximum is attained or even exceeded.

In the event of exceeding of the maximum value, a backward step 918 is performed during which the value of α is decremented by one step size so as to obtain the optimum coefficient $\alpha_0$, corresponding to the optimum multiplication factor $i_0$ equal to the current value of the variable i.

In the embodiment described here, a step by step method is therefore applied for adjusting the selector of the delay system 680-1. However, it would be just as possible to vary the step size towards finer and finer values, or to use a dichotomic process.

At the end of the adjustment, the coefficients obtained multiplying the duration of the delay T in the delay system 680-1 are stored and serve as a starting point for the latter. The assembly 680-2 begins to function with zero coefficients.

As soon as the phase match between the original signal and the reconstructed signal is obtained, a second adjustment operation is performed conjointly on the cells 680-1 and 680-2 using an operation of subtracting the two signals entering the unit 716 (FIG. 7) or 623 (FIG. 6). The gain β, which is the coefficient of the multiplier 629 of FIG. 6, is then varied until a minimum value of the result of the subtraction is detected.

Figure 10:
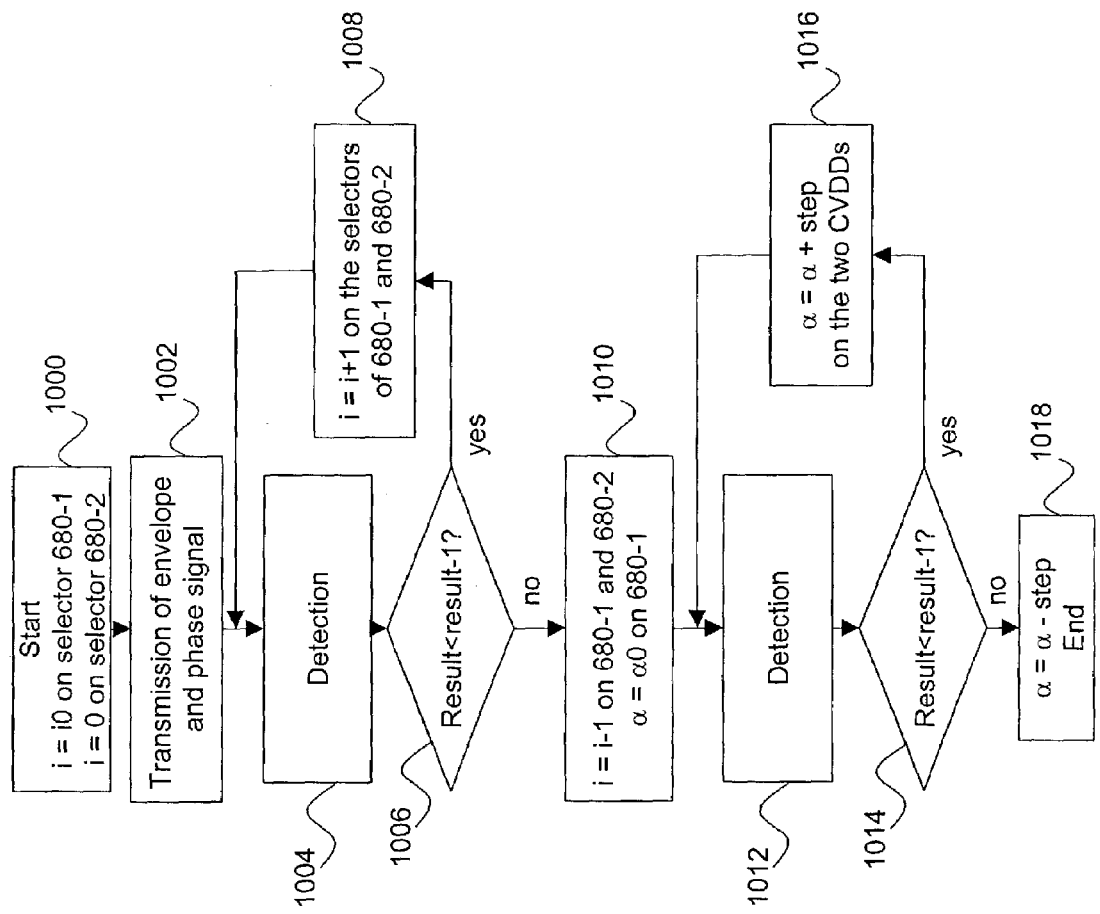
FIG. 10 is a flow diagram illustrating the adjustment of the synchronism of the envelope and of the phase between the original signal and the reconstructed signal, in accordance with the present invention, in a particular embodiment.

For the detection of the synchronism of the envelope and phase, the delays introduced by the two delay cells 680-1 and 680-2 are then varied conjointly until matching is obtained between the original signal and its reconstruction, as illustrated by the flow diagram in FIG. 10.

It should be noted that, when the delay of the cell 680-2 (FIG. 6) or 714 (FIG. 7) is adjusted, it is necessary to vary concomitantly the delay introduced by the cell 680-1 (FIG. 6) or 713 (FIG. 7), since the delay introduced by the cell 680-1 corrects an absolute delay between the phase signal and the copy of the signal used for the measurement, while the delay introduced by the cell 680-2 corrects only the difference in synchronization between the phase and the envelope. The problem is therefore posed of maintaining the absolute delay between the phase signal and the copy of the signal used for the measurement, while the delay of this phase signal is precisely made to vary. This is the reason why it is necessary to vary at the same time the delays applied by the cells 680-1 and 680-2.

As shown by FIG. 10, during an initialization step 1000, there is allocated to the variable i, which is the multiplication factor for the sampling clock period for the selectors of the cells 680-1 and 680-2, respectively the value $i_0$ determined previously, for the cell 680-1, and the value 0 for the cell 680-2.

Next, during a step 1002, the envelope signal and the phase signal are transmitted. During the following step 1004, a signal is detected by subtracting the two signals entering the unit 716 or 623. By means of a test 1006, the minimum thereof is sought and, as long as this minimum has not been attained, the variable i of the selectors of the cells 680-1 and 680-2 is incremented by one unit, during a step 1008.

At step 1010, the minimum is attained, or even exceeded. In the event of it being exceeded, the value of i is decremented by one unit. Then the process is commenced of step by step optimization of the coefficient α on the Farrow cells of the cells 680-1 and 680-2 from the value $α_0$ for the cell 680-1 and in accordance with steps 1012, 1014 and 1016 similar to steps 1004, 1006 and 1008 described above. If the optimum value of α is exceeded, at step 1018, the value of α is reduced by one step size. At the end of step 1018, the whole of the system is synchronized.

Figure 11:
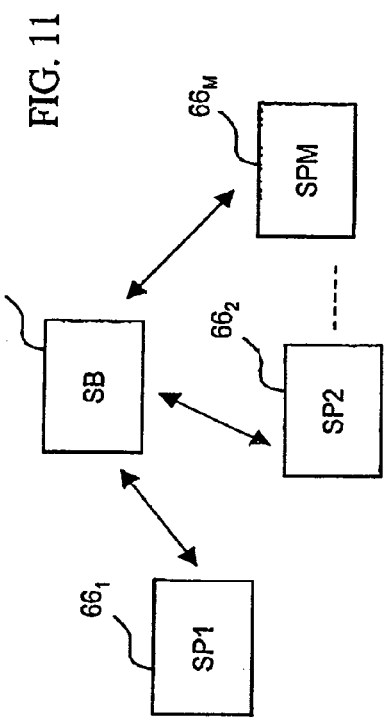
FIG. 11 depicts, in a simplified schematic form, a telecommunications network according to the present invention.

As shown by FIG. 11, a network according to the invention consists of at least one station known as a base station SB designated by the reference 64, and several peripheral stations known as mobile terminals SPi, i=1, . . . , M, where M is an integer greater than or equal to 1, respectively designated by the references $66_1$, $66_2$, . . . , $66_M$. The peripheral stations $66_1$, $66_2$, . . . , $66_M$ are distant from the base station SB, each connected by a radio link with the base station SB and able to move with respect to the latter.

The base station 64 can comprise means adapted to implement a transmission-reception method according to the invention. As a variant, the base station 64 can comprise a transceiver according to the invention. In a similar fashion, at least one of the mobile terminals $66_i$ can comprise means adapted to implement a transmission-reception method according to the invention or comprise a transceiver according to the invention.

It will be observed that the invention makes it possible to extend the E.E.R. architecture when several frequency transpositions are necessary. This significantly reduces the energy consumption of a transmitter.

The invention claimed is:

1. A wireless transmitter for transmitting a signal, said wireless transmitter composed of at least one modulator, said modulator comprising a digital part and an analog part, wherein the digital part comprises:

envelope generating means for generating an envelope signal carrying envelope information of the signal modulated with a first carrier frequency, referred to as a first modulated signal;

first delaying means for delaying the first modulated signal, wherein said first delaying means comprises a first variable interpolation cell;

phase generating means for generating a phase signal carrying phase information of the delayed first modulated signal, said phase and envelope signals being used to produce a second modulated signal by transposing the modulation of said signal from the first carrier frequency to a second carrier frequency;

second delaying means for delaying the first modulated signal, wherein said second delaying means comprises a second variable interpolation cell;

comparison means for comparing the second modulated signal with the delayed first modulated signal using the second delaying means; and controlling means adapted to supply said first and second variable interpolations cells control signals for enabling the delays applied by said first and second cells to be adjusted.

2. The wireless transmitter according to claim 1, wherein the first variable interpolation cell comprises:

means for applying a continuously variable delay which is not a multiple of a sampling period used for the digital part;

a plurality of delay elements connected in series and connected to the output of said means of applying a continuously variable delay; and means for selecting a total value of the delay to be applied by the first variable interpolation cell.

3. The wireless transmitter according to claim 1, further comprising frequency transposition means for transposing the phase signal from the first carrier frequency to the second carrier frequency.

4. The wireless transmitter according to claim 3, comprising an amplifier for amplifying the transposed phase signal carrying the phase information.

5. The wireless transmitter according to claim 4, wherein the amplifier is supplied the envelope signal carrying the envelope information.

6. The wireless transmitter according to claim 1, wherein the analog part comprises delay application means acting on the phase of the signals to be transmitted.

7. A method of adjusting the synchronism of the phase between an original signal transmitted by a transmitter according to claim 1 and a signal reconstructed on reception, said method being implemented by controlling means comprised in the transmitter, comprising steps according to which:

a principal phase delay value is determined, which is an integer multiple of a sampling period; and then a residual value of said delay is determined.

8. The method according to claim 7, wherein, during steps of determining the principal and residual values of said delay:

the two signals compared by said comparison means are multiplied with each other; and the value of the phase delay is varied until the maximum value of the product of said two signals is obtained.

9. A digital signal processing apparatus, comprising a transmitter according to claim 1.

10. A telecommunications network, comprising a transmitter according to claim 1.

11. A mobile station in a telecommunications network, comprising a transmitter according to claim 1.

12. A base station in a telecommunications network, comprising a transmitter according to claim 1.

* * * * *

UNITED STATES PATENT AND TRADEMARK OFFICE
CERTIFICATE OF CORRECTION

PATENT NO.       : 7,206,356 B2                                              Page 1 of 1
APPLICATION NO.  : 10/395184
DATED            : April 17, 2007
INVENTOR(S)      : Le Bars et al.

It is certified that error appears in the above-identified patent and that said Letters Patent is hereby corrected as shown below:

COLUMN 11:
Line 49, "$66_M.$ The" should read -- $66_M.$ The --; and
Line 50, "$66_M$ are" should read -- $66_M$ are --.

COLUMN 12:
Line 23, "interpolations" should read -- interpolation --.

Signed and Sealed this

Fourth Day of March, 2008

JON W. DUDAS
*Director of the United States Patent and Trademark Office*